April 2, 1963 — E. J. BLUTH ETAL — 3,084,210
CONNECTION FOR SUBMERSIBLE MOTORS
Filed March 28, 1960
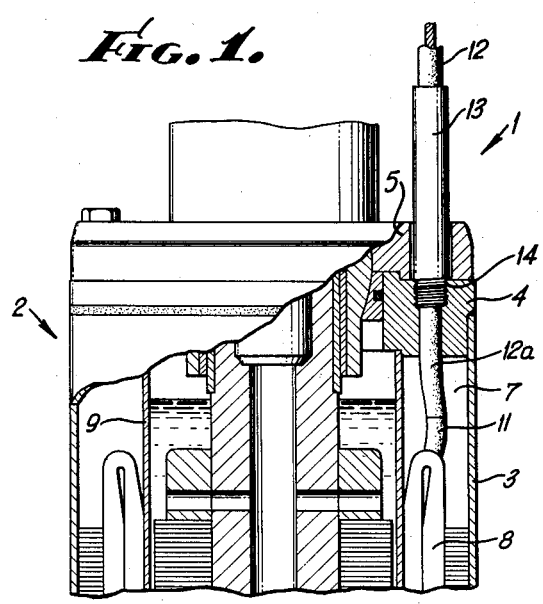
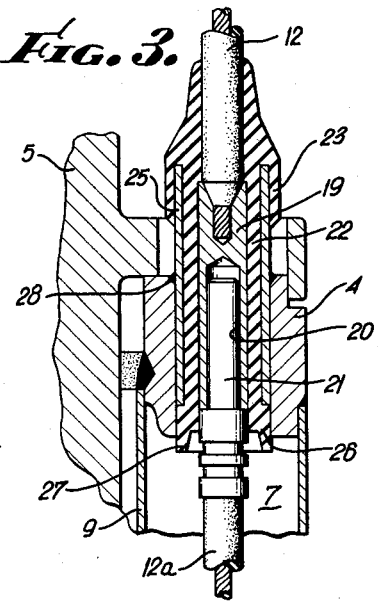
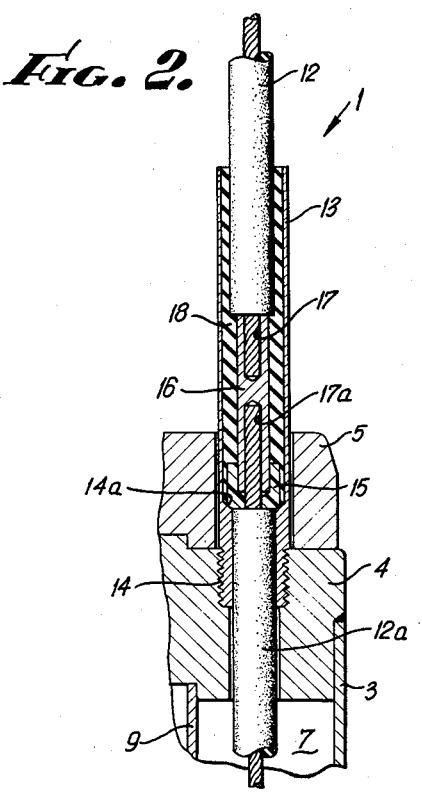
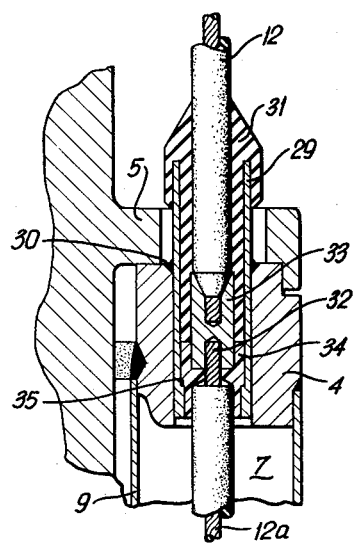
Edward J. Bluth
James R. Green
INVENTORS.
BY Flam and Flam
ATTORNEYS.

United States Patent Office 3,084,210
Patented Apr. 2, 1963

3,084,210
CONNECTION FOR SUBMERSIBLE MOTORS
Edward J. Bluth, Downey, and James R. Green, Garden Grove, Calif., assignors, by mesne assignments, to The Emerson Electric Manufacturing Company, St. Louis, Mo., a corporation of Missouri
Filed Mar. 28, 1960, Ser. No. 18,126
2 Claims. (Cl. 174—65)

This invention relates to the conduction of electrical energy to a load within a sealed space, such for example to a submersible electric motor. More particularly, the invention is designed to provide electrical connections for the stator of the motor from the exterior to the interior of the casing without destroying the water-tightness of the motor casing.

Various forms of sealed connections have been proposed and have been used with considerable success. Nevertheless, it has been difficult to install such connections; e.g., it may be necessary to mold heated plastic or to vulcanize a rubber composition to the stator assembly. This entails handling a relatively large and bulky press in association with the entire motor.

It is one of the objects of this invention to make it possible to provide the required vulcanization or equivalent before installation of the connector on the casing, the final seal being effected by a soldering operation between a metal ferrule and the casing of the motor. By this means, also, it is a simple matter to remove the coupling structure by causing a separation of the ferrule from the casing, as by the aplication of heat.

It is another object of this invention to make it possible to test each lead assembly under pressure to determine whether the vulcanizing has been properly done before installing it.

In some instances, the stator is filled with a thermosetting plastic compound which is injected into the stator cavity. By making it possible to install the lead assembly prior to the injection, the casing can be vacuum-tested for leakage around the lead assembly; and if found defective at the solder joint, it can be readily repaired before the stator is filled with the thermo-setting material.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:
FIGURE 1 is a diagrammatic fragmentary sectional view of a motor incorporating the invention; and
FIGS. 2, 3 and 4 are enlarged fragmentary sectional views showing three forms of the invention.

In the present instance, a coupling member 1 is shown as installed in connection with a submersible motor 2. This submersible motor 2 has an outer shell or casing 3 carrying a collar 4. It also has an extension 5 connected to the collar 4.

The collar 4 forms a part of the motor housing and serves to define a closed chamber 7 in which is located the stator winding 8. This chamber may be filled with a thermo-setting plastic after the coupling member 1 is installed.

An inner tubular member 9 serves to define the annular space 7 and may be installed, as by welding or the like, with the collar 4.

A lead 11 extends from the windings of the stator to be connected to an insulated length of cable 12a. This cable is connected into the coupling member 1 in a manner to be hereinafter described.

At the opposite end of the coupling member 1 there is a rubber insulated stranded cable structure 12, which extends into the upper end of the coupling structure.

In the form shown in FIG. 1, a ferrule 13, made of metal such as brass, is shown as having a lower threaded portion 14 adapted to be threaded into a corresponding aperture in the collar 4.

The lower end of the ferrule 13 is thickened, providing a sloping shoulder 14a upon which rests an insulation sleeve 15.

This insulation sleeve surrounds the lower end of a connecting member 16 which is located within the ferrule 13. This connecting member 16 may be made of a conducting material having opposed recesses 17 and 17a. Into these recesses extend bared ends of the cable elements 12 and 12a. Appropriate means may be provided to secure proper electrical connection between the cable ends and the connecting member 16.

Interposed between the connector 16 and the ferrule 13 is a layer of vulcanized rubber plug 18. This rubber is vulcanized to the exterior insulation layer of cable 12, as well as to the ferrule 13 and to the exterior of connector 16. Thus, a complete seal is effected. This vulcanized rubber layer 18 is formed while the ferrule and the cables 12 and 12a are not assembled with the motor structure. Accordingly, it may be appropriately placed into a press to perform the vulcanizing operation and to provide complete insulation between the connector 16 and associated leads 12 and 12a.

By tightening the threads of the lower end 14 of the ferrule 13, a complete seal is provided.

Vulcanization being accomplished without the necessity of installing the coupling structure 1 in the motor collar 4, the device may be conveniently and effectively assembled.

The coupling structure 1 may then be installed in a motor structure before the tubular member 9 is assembled. Then the coupling structure may be vacuum-tested to determine whether there are any leaks through the coupling structure into the space 7. If it is found upon testing that the device 1 is free of leaks, the tube 9 can be installed, as by welding, and the cavity or space 7 may then be filled with the insulating compound.

In the form shown in FIG. 2, the cable 12a is indicated as having a bared end permanently joined to the coupling member 16.

In the form shown in FIG. 3, the coupling member 19 is provided with a relatively deep recess 20 in which a connection plug 21 may be resiliently inserted. This plug 21 is carried by the end of the cable 12a.

In this instance, the vulcanized rubber insulation or plug 22 carries an upper portion 23 having a thin layer extending over the top edge and around the periphery of the ferrule 25. The lower end 26 of the vulcanized rubber 22 also extends over the lower edge of the ferrule 25 and has a lower projecting flange 27 forming a reenforcing collar.

In this form of the invention, the ferrule 25 is in the form of a tube which is soldered, as indicated at 28, within an aperture in collar 4. Soldering may be readily accomplished after the vulcanization of rubber 22 is completed. By tinning the appropriate surfaces of the collar 4 and the ferrule 25, these surfaces may be firmly attached by application of a concentrated source of heat to the collar 4 and to the ferrule, as by a torch. This causes the tinning to melt and adhere to both the ferrule 25 and the aperture in collar 4.

As in the first form, the connector structure may be installed within the collar 4 and vacuum-tested for leaks.

In the event that the soldered joint 28 shows a leak, it is a simple matter to remove it by remelting the solder, and repair it without disturbing the other parts of the motor.

After it has been tested and found satisfactory, the coupling device may be finally installed and the tubular member 9 welded in place so as to provide the closed space 7 for the accommodation of the thermo-setting plastic.

The ferrule 25 is purposely made long enough so that the heat applied to the parts for the soldering operation will not adversely affect the rubber insulation 23.

In the form of the invention illustrated in FIG. 4, the ferrule 29 is soldered as before, as indicated by the solder joint 30. The rubber insulation or plug 31 is vulcanized prior to the soldering operation.

Cable 12a has a bared end 32 permanently attached to the connector 33. As in the form shown in FIG. 2, an insulation sleeve 34, such as nylon, is seated upon a shoulder 35 formed at the lower end of the ferrule 29. The lower end of the insulating rubber material 31 contacts the upper end of the sleeve 34, and together they cooperate fully to enclose the connector 33.

The inventors claim:

1. A removable sealed electrical coupling for a housing comprising: a housing having an aperture therethrough, a metal ferrule telescopically fitted in said aperture for slidable insertion therein from the exterior of said housing and removal therefrom to the exterior of said housing, a solder joint located at the exterior juncture of said housing and ferrule sealing the exterior surface of said ferrule to said housing around the exterior rim of said aperture, a connector having two noncommunicating recesses at opposite ends and located in said ferrule, a first insulated electrical lead extending into and connected to one of said recesses from the exterior of said housing, a second lead extending into and connected to the other of said recesses from the interior of said housing, and a resilient rubber plug surrounding said connector and a portion of said first lead and a portion of its insulation and filling the space between these parts and the interior of said ferrule and being bonded to said ferrule, said connector, and said portion of insulation, whereby said assembled connector, leads, plug and ferrule may be repeatedly removed from and sealingly seated in said aperture.

2. A removable sealed electrical coupling as set forth in claim 1, wherein said plug extends over the end of said ferrule located exteriorly of said housing and over an adjacent exterior surface portion of said ferrule.

References Cited in the file of this patent
UNITED STATES PATENTS

| | | |
|---|---|---|
| 822,293 | Moody | June 5, 1906 |
| 2,310,423 | Gold | Feb. 9, 1943 |
| 2,651,672 | Ivanoff | Sept. 8, 1953 |
| 2,987,570 | Bluth | June 6, 1961 |